US012013097B2

(12) United States Patent
Howard

(10) Patent No.: US 12,013,097 B2
(45) Date of Patent: Jun. 18, 2024

(54) FINISHING SHROUD FOR A DOWNLIGHT AND A DOWNLIGHT FORMED THEREWITH

(71) Applicant: Dennis Howard, Phoenix, AZ (US)

(72) Inventor: Dennis Howard, Phoenix, AZ (US)

( * ) Notice: Subject to any disclaimer, the term of this patent is extended or adjusted under 35 U.S.C. 154(b) by 0 days.

(21) Appl. No.: 18/057,211

(22) Filed: Nov. 20, 2022

(65) Prior Publication Data

US 2024/0167649 A1 May 23, 2024

(51) Int. Cl.
*F21S 8/02* (2006.01)
*F21V 21/04* (2006.01)

(52) U.S. Cl.
CPC .............. *F21S 8/026* (2013.01); *F21V 21/04* (2013.01)

(58) Field of Classification Search
CPC ................................ F21S 8/026; F21V 21/04
See application file for complete search history.

(56) References Cited

U.S. PATENT DOCUMENTS

| | | | | |
|---|---|---|---|---|
| 5,597,234 A * | 1/1997 | Winkelhake | F21V 17/168 | 362/365 |
| 7,784,979 B2 * | 8/2010 | Wronski | F21S 8/02 | 362/306 |
| 9,677,747 B2 * | 6/2017 | Highbridge | F21S 8/03 | |
| 10,125,958 B1 * | 11/2018 | Wronski | F21V 21/047 | |
| 10,704,771 B2 * | 7/2020 | Schubert | F21V 21/04 | |
| 10,851,977 B2 * | 12/2020 | Mathews | F21S 8/02 | |
| 2002/0129946 A1 * | 9/2002 | Retzloff | A62C 37/09 | 169/37 |
| 2004/0177572 A1 * | 9/2004 | Burgess | F21V 21/04 | 52/220.8 |
| 2017/0184285 A1 * | 6/2017 | Visser | F21V 23/008 | |
| 2019/0063701 A1 * | 2/2019 | Lotfi | F21V 23/026 | |
| 2022/0325857 A1 * | 10/2022 | David | F21V 17/06 | |
| 2023/0060375 A1 * | 3/2023 | David | F21V 19/02 | |

* cited by examiner

*Primary Examiner* — Tsion Tumebo
(74) *Attorney, Agent, or Firm* — Parsons & Goltry, PLLC; Michael W. Goltry; Robert A. Parsons

(57) ABSTRACT

A finishing shroud for a downlight includes an annular body including an upper section extending downward from a rim to a lower section extending downward from the upper section to a horizontal flange extending outward radially to a perimeter extremity. The upper section has tensionable couplings extending outward from the upper section to contact surfaces configured to frictionally engage an inner surface of a downlight housing. A light-flow pathway extends through the annular body from an inlet defined by the rim to an outlet defined by the lower section. A finishing flange extends outward radially from the perimeter extremity to a perimeter edge, is tensionable, has a normal orientation extending upward from the horizontal flange to the perimeter edge, and is tensioned when flexed out of the normal orientation to an activated orientation.

32 Claims, 17 Drawing Sheets

FINISHING SHROUD FOR A DOWNLIGHT AND A DOWNLIGHT FORMED THEREWITH

FIELD OF THE INVENTION

The present invention generally relates to downlights and downlight finishing shrouds.

BACKGROUND OF THE INVENTION

A downlight, such as a recessed or cannister light, sometimes referred to as a can light, is a light fixture installation installed at an opening of a building's ceiling. A standard downlight includes a housing configured with a light support that supports a lamp, and a hanger assembly. The housing, typically a cylindrical can, defines a chamber and has a rim defining an opening that is open to the chamber where the light support and the lamp reside. The hanger assembly supports the housing that extends downward from the coupling and into the ceiling's opening to the rim when the hanger assembly is suitably coupled to the building's framing. The housing's rim is visible at the ceiling's opening. Light generated by the lamp shines through the housing's opening and the opening in the ceiling, concentrating the light in a downward direction as a broad floodlight or narrow spotlight.

A standard downlight often has a finishing flange extending over the lower side of the ceiling from the housing's rim. The finishing flange hides the housing's rim and imperfections in the lower side of the ceiling around its opening and forms a part of the ceiling's finish. However, the flange's shape, finish, and color are often undesirable, distracting, and aesthetically unpleasing. Existing finishing flanges are also difficult or cumbersome to install, requiring separate fasteners, brackets and specialized skill to secure the flange to the lower side of the ceiling and to the housing. Some finishing flanges form part of a multi-part finishing flange assembly, including a structural support, such as a support ring, connected between the housing and the flange. Some multi-part finishing flange assemblies are available pre-assembled. However, multi-part finishing flange assemblies are structurally complex, inherently expensive, difficult to install, and require specialized fittings or fasteners to assemble the structural support and the flange and secure the assembly to the housing. Additionally, readily-available flanges often have openings configured to receive and hold joint compound of the wall finish formed over the flange. However, the flange openings create weak spots in the flange that render it inherently susceptible to cracking.

SUMMARY OF THE INVENTION

According to the invention, a finishing shroud for a downlight includes an annular body including an upper section and a lower section. The upper section is configured with couplings and extends downward from a rim to the lower section. The lower section extends downward from the upper section to a horizontal flange that extends outward radially to a perimeter extremity. The couplings are tensionable, spaced apart circumferentially and each extends outward from the upper section to a contact surface. A light-flow pathway extends through the annular body from an inlet defined by the rim to an outlet defined by the lower section. A finishing flange extends outward radially from the perimeter extremity to a perimeter edge. The finishing flange is tensionable, has a normal orientation extending upward from the horizontal flange to the perimeter edge, and is tensioned when flexed out of the normal orientation to an activated orientation. The perimeter edge is notched, defining alternating notches and tabs. The notches are identical and the tabs are identical. The annular body and the finishing flange are without openings. The couplings each includes a first arm including a first end connected to the upper section and a second arm including a second end connected to the upper section. The first end and the second end are spaced apart circumferentially. The first arm and the second arm converge outward at an outwardly curved extremity from the first end and the second end, respectively. The outwardly curved extremity defines the contact surface, which curves outwardly. The first end and the second end are each formed integrally with the upper section.

According to the invention, a downlight includes a finishing shroud and a downlight housing. The finishing shroud includes an annular body including an upper section and a lower section. The upper section is configured with couplings and extends downward from a rim to the lower section. The lower section extends downward from the upper section to a horizontal flange that extends outward radially to a perimeter extremity. The couplings are tensionable, spaced apart circumferentially and each extends outward from the upper section to a contact surface. A light-flow pathway extends through the annular body from an inlet defined by the rim to an outlet defined by the lower section. A finishing flange extends outward radially from the perimeter extremity to a perimeter edge. The finishing flange is tensionable, has a normal orientation extending upward from the horizontal flange to the perimeter edge, and is tensioned when flexed out of the normal orientation to an activated orientation. The downlight housing includes an inner surface encircling a chamber and a housing rim encircling a housing opening to the chamber. A ceiling includes an upper side, a lower side, and a ceiling opening through the ceiling from the upper side to the lower side. The downlight housing extends downward into the ceiling opening through the upper side to the housing rim adjacent to the lower side. The couplings concurrently tension the respective contact surfaces against the inner surface, securing the shroud to the inner surface of the downlight housing frictionally. The upper section extends downward through the chamber from the rim to the lower section. The lower section extends downward from the upper section and outward through the housing opening and the ceiling opening and under the housing rim to the horizontal flange, which extends outward radially under the lower side to the perimeter extremity beyond the housing rim and the ceiling opening. The finishing flange extends outward radially under the lower side from the perimeter extremity to the perimeter edge. The finishing flange is pressed against the lower side flexing the finishing flange out of the normal orientation to the activated orientation tensioning the finishing flange constantly urging it upward against the lower side, disabling the perimeter edge from turning downward from the lower side. The inlet opens upward to the chamber. A finishing material is applied over the finishing flange from the perimeter edge to the perimeter extremity and over the annular body from the perimeter extremity to the rim. The finishing material is a plaster or a joint compound. The perimeter edge is notched, defining alternating notches and tabs. The notches are identical and the tabs are identical. The annular body and the finishing flange are without openings. The couplings each includes a first arm including a first end connected to the outer surface and a second arm including a second end connected to the outer surface. The first end and the second end are spaced apart circumferentially. The first arm and the second arm converge outward at an outwardly curved extremity from the first end and the second end, respectively. The outwardly curved extremity defines the contact surface, which curves outwardly. The first end and the second end are each formed integrally with the upper section.

According to the invention, a finishing shroud for a downlight includes an annular body including an upper section, a lower section, an inner surface, and an outer surface. The upper section is cylindrical, configured with couplings, and extends downward from a rim to the lower section. The lower section extends downward from the upper section to a horizontal flange that extends outward radially to a perimeter extremity. The inner surface and the outer surface extend from the rim to the perimeter extremity. The couplings are tensionable, spaced apart circumferentially and each extends outward from the outer surface to a contact surface. A light-flow pathway extends through the annular body from an inlet defined by the rim to an outlet defined by the lower section. The inner surface of the lower section is a transition surface between the upper section and the horizontal flange. A finishing flange extends outward radially from the perimeter extremity to a perimeter edge. The finishing flange includes an upper surface and a lower surface extending from the perimeter extremity to the perimeter edge. The finishing flange is tensionable, has a normal orientation extending upward from the horizontal flange to the perimeter edge, and is tensioned when flexed out of the normal orientation to an activated orientation. The perimeter edge notched, defining alternating notches and tabs. The notches are identical and the tabs are identical. The annular body and the finishing flange are without openings. The upper surface extends from the outer surface at a coplanar transition therebetween. The lower surface intersects an axial surface of the perimeter extremity forming an annular notch. The couplings each includes a first arm including a first end connected to the outer surface and a second arm including a second end connected to the outer surface. The first end and the second end are spaced apart circumferentially. The first arm and the second arm converge outward at an outwardly curved extremity from the first end and the second end, respectively. The outwardly curved extremity defines the contact surface, which curves outwardly. The first end and the second end are each formed integrally with the upper section.

According to the invention, a downlight includes a finishing shroud and a downlight housing. The finishing shroud includes an annular body including an upper section, a lower section, an inner surface, and an outer surface. The upper section is cylindrical, configured with couplings, and extends downward from a rim to the lower section. The lower section extends downward from the upper section to a horizontal flange that extends outward radially to a perimeter extremity. The inner surface and the outer surface extend from the rim to the perimeter extremity. The couplings are tensionable, spaced apart circumferentially and each extends outward from the outer surface to a contact surface. A light-flow pathway extends through the annular body from an inlet defined by the rim to an outlet defined by the lower section. The inner surface of the lower section is a transition surface between the upper section and the horizontal flange. A finishing flange extends outward radially from the perimeter extremity to a perimeter edge. The finishing flange includes an upper surface and a lower surface extending from the perimeter extremity to the perimeter edge. The finishing flange is tensionable, has a normal orientation extending upward from the horizontal flange to the perimeter edge, and is tensioned when flexed out of the normal orientation to an activated orientation. A ceiling includes an upper side, a lower side, and a ceiling opening through the ceiling from the upper side to the lower side. The downlight housing includes an inner surface encircling a chamber and a housing rim encircling a housing opening to the chamber. The downlight housing extends downward into the ceiling opening through the upper side to the housing rim adjacent to the lower side. The couplings concurrently tension the contact surfaces against the inner surface, securing the shroud to the inner surface of the downlight housing frictionally. The upper section extends downward through the chamber from the rim to the lower section. The lower section extends downward from the upper section and outward through the housing opening and the ceiling opening and under the housing rim to the horizontal flange that extends outward radially under the lower side to the perimeter extremity beyond the housing rim and the ceiling opening. The finishing flange extends outward radially under the lower side from the perimeter extremity to the perimeter edge. The upper surface is pressed against the lower side flexing the finishing flange out of the normal orientation to the activated orientation tensioning the finishing flange constantly urging the upper surface upward against the lower side, disabling the perimeter edge from turning downward from the lower side. The inlet opens upward to the chamber. A finishing material is applied over the lower surface of the finishing flange from the perimeter edge to the perimeter extremity and over the inner surface of the annular body from the perimeter extremity to the rim. The finishing material is contoured to the inner surface of the annular body across the transition surface thereof from the perimeter extremity to the rim. The finishing material is a plaster or a joint compound. The perimeter edge is notched, defining alternating notches and tabs. The notches are identical and the tabs are identical. The annular body and the finishing flange are without openings. The upper surface extends from the outer surface at a coplanar transition therebetween. The lower surface intersects an axial surface of the perimeter extremity forming an annular notch. The couplings each includes a first arm including a first end connected to the outer surface and a second arm including a second end connected to the outer surface. The first end and the second end are spaced apart circumferentially. The first arm and the second arm converge outward at an outwardly curved extremity from the first end and the second end, respectively. The outwardly curved extremity defines the contact surface, which curves outwardly. The first end and the second end are each formed integrally with the upper section.

BRIEF DESCRIPTION OF THE DRAWINGS

Specific objects and advantages of the invention will become apparent to those skilled in the art from the following detailed description of illustrative embodiments thereof, taken in conjunction with the drawings in which.

DETAILED DESCRIPTION

Figure 1:
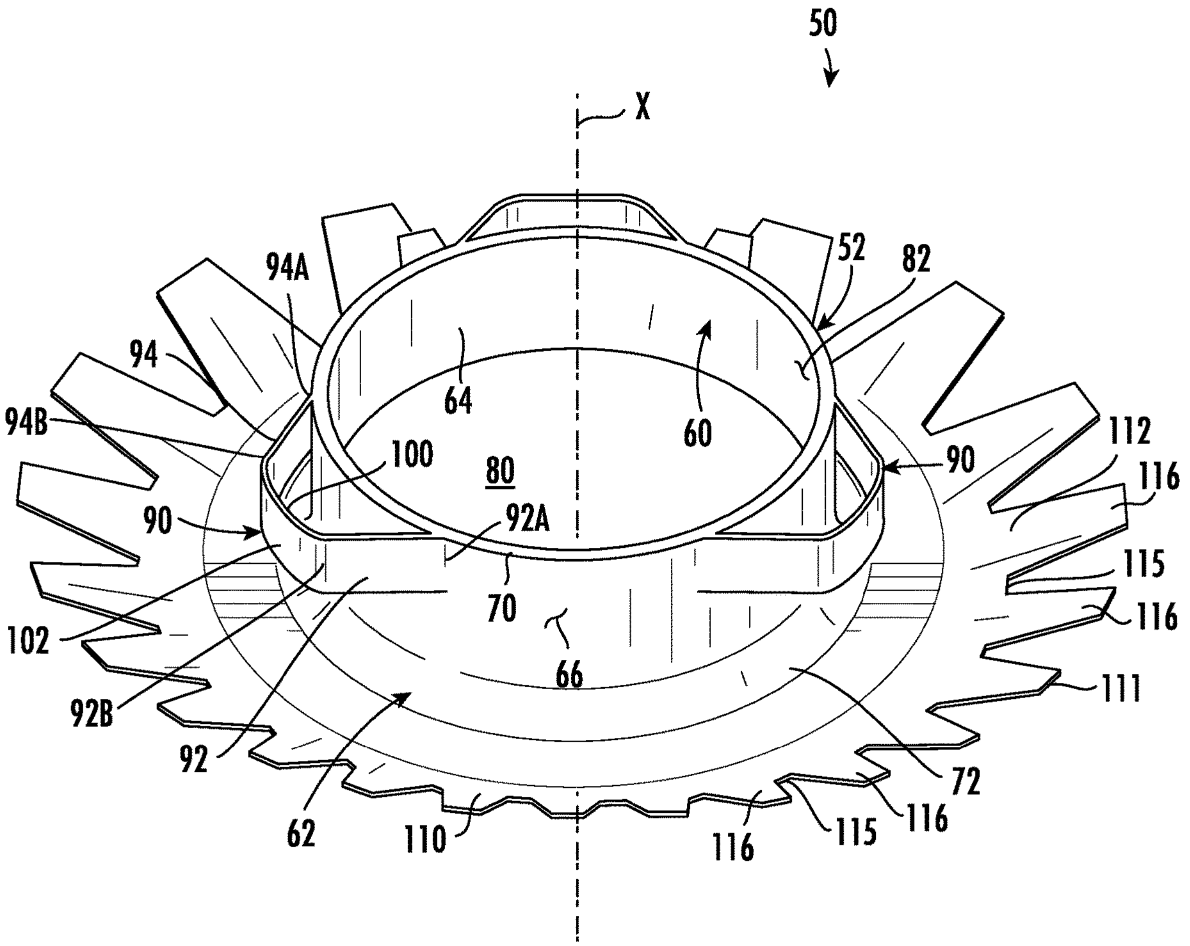
FIG. 1 is a top perspective view of a finishing shroud for a downlight, the finishing shroud constructed and arranged according to the invention.
Figure 2:
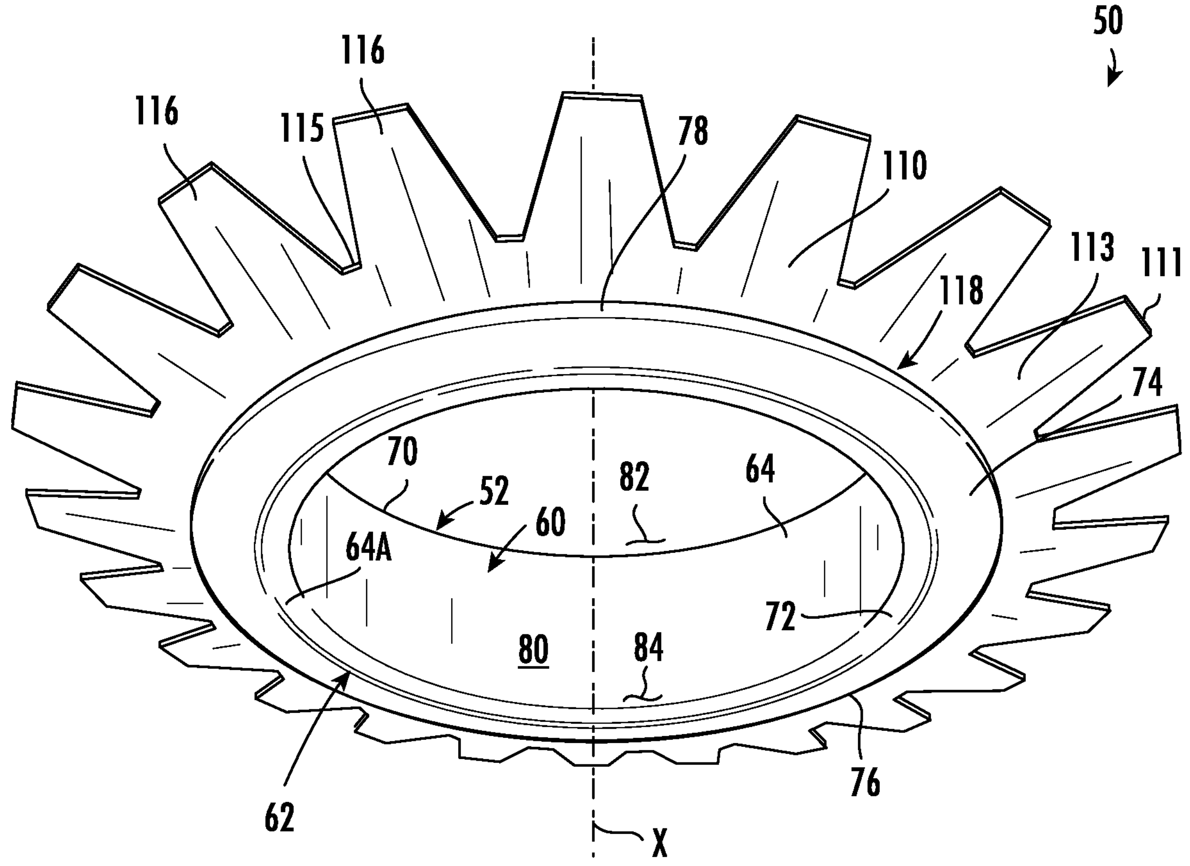
FIG. 2 is a bottom perspective view of the embodiment of FIG. 1.
Figure 3:
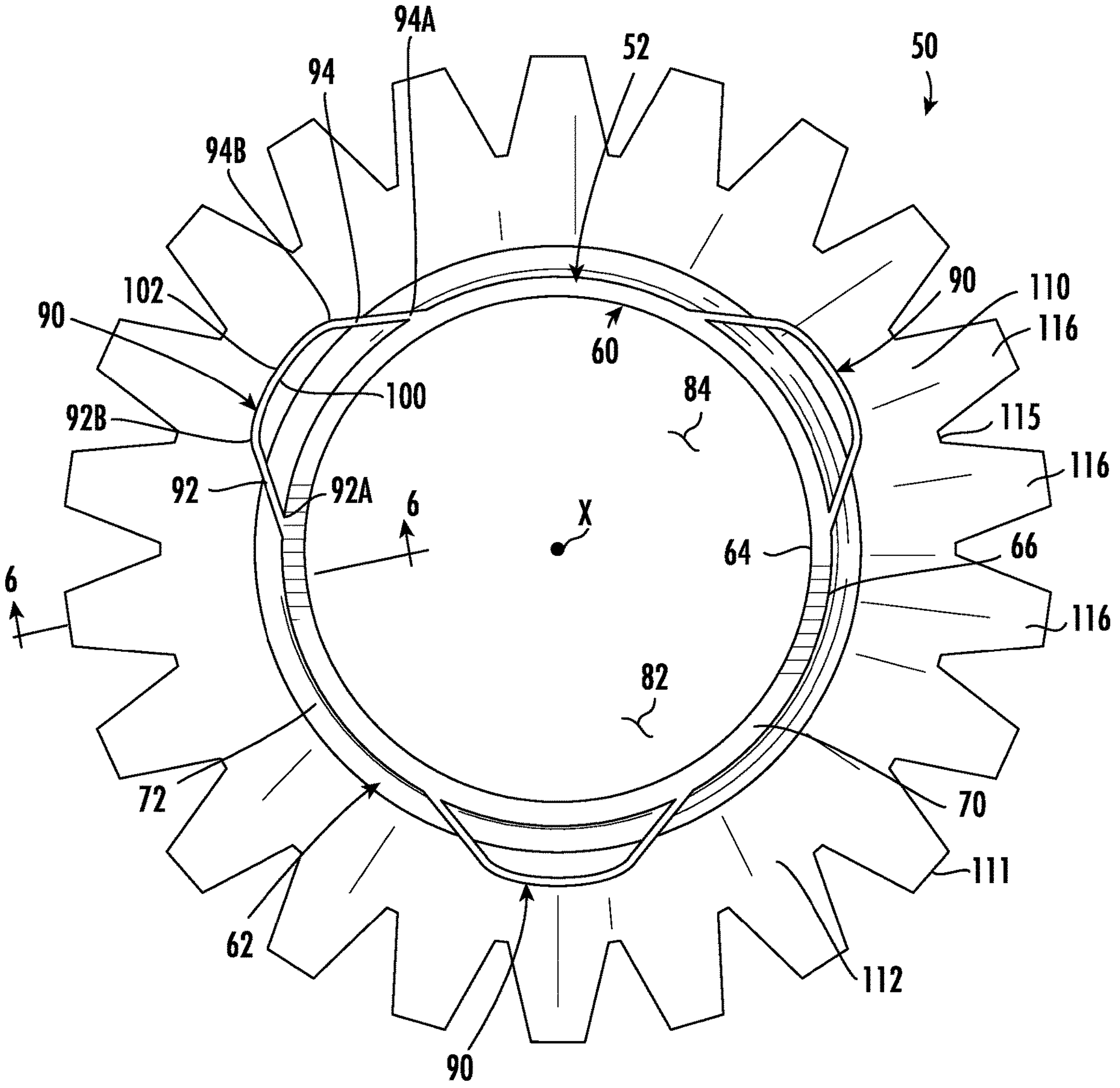
FIG. 3 is a top plan view of the embodiment of FIG. 1.
Figure 4:
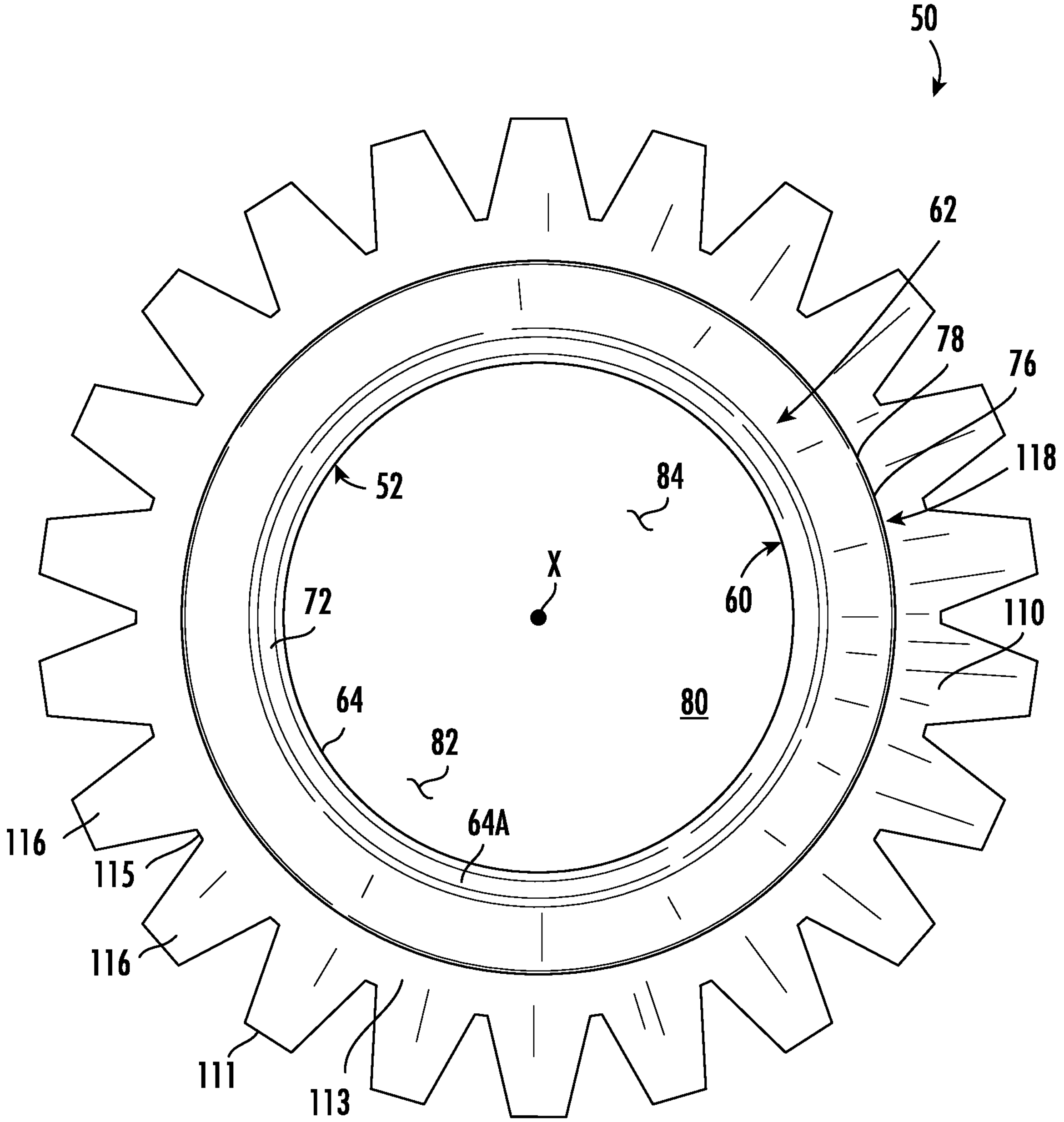
FIG. 4 is a bottom plan view of the embodiment of FIG. 1.

Disclosed are a finishing shroud for a downlight, a downlight configured with the finishing shroud, and methods of finishing a downlight.

FIGS. 1-6 illustrate a finishing shroud 50 for a downlight, the finishing shroud 50 constructed and arranged according to the invention. Shroud 50 is preferably a unitary, integral, or otherwise single-piece structure molded or machined from plastic, aluminum, steel, or other material or a combination of materials with inherently resilient, rugged, and impact-resistant material characteristics. Referring to FIGS. 1-6 in relevant part, shroud 50 includes an annular body 52. The annular body 52, a continuous annular wall, includes an upper section 60, a lower section 62, an inner surface 64, and an outer surface 66. The upper section 60, a cylindrical collar, extends downward from a circular rim 70 at the upper end of the annular body 52 to the lower section 62. The lower section 62 extends downward from the upper section 60 and curves outward radially in along its transition, its curved part 72, to the lower section's 62 horizontal flange 74 at the lower end of the annular body 52. The curved part 72 is the shroud's 50 transition between the upper section 60 and the flange 74. The flange 74, an annular support flange, is a continuous ring that extends outward radially to a circular perimeter edge or extremity 76 defining an axial surface 78 in FIG. 6 that is directed outward. The inner surface 64 and the outer surface 66 extend from the rim 70 to the perimeter extremity 76. The inner surface 64 of the curved part 72 is a transition surface 64A. The transition surface 64A is rounded, it rounds outwardly between the upper section 60 and the flange 74. The inner surface 64 of the upper section 60 and the inner surface 64 of the flange 74 of the lower section 62 do not meet at a corner in the present embodiment. Rather, the inner surface 64 of the upper section 60 and the inner surface 64 of the flange 74 of the lower section 62 meet at the transition surface 64A that extends between the upper section's 60 inner surface 64 and flange's 74 inner surface 64. The inner surface 64 defines a light-flow pathway 80 that extends through the annular body 52 from its inlet 82 to its underlying outlet 84 defined by the inner surface 64 of the lower section's 62 curved part 72. Since the inner surface 64 of the lower section's 62 curved part 72 is rounded, being the rounded transition surface 64A, the shroud's 50 outlet 84 defined by the transition surface 64A is a "rounded perimeter" outlet 84. The annular body 52 is arranged and symmetrical about axis X, which extends through the light flow pathway 80 from the inlet 82 to the outlet 84. The annular body 52 is without openings throughout its extent. The upper section 60 has couplings 90. The couplings 90 are tensionable, being flexible, resilient, are spaced apart circumferentially about the upper section 60, are between the rim 70 and the lower section 62, and extend outward from the outer surface 66 to respective contact surfaces 102. The couplings 90 are identical. Each coupling 90 is a generally V-shaped member, including an arm 92, having an inner end 92A connected to the outer surface 66 and an opposed outer end 92B, and another arm 94, having an inner end 94A connected to the outer surface 66 and an opposed outer end 94B. The inner ends 92A and 94A are spaced apart circumferentially. The arms 92 and 94 are coextensive, being the same size and shape. The arms 92 and 94 extend outward from the respective inner ends 92A and 94A, connected to the outer surface 66, and converge outwardly to their respective outer ends 92B and 94B connected to either end of an outer extremity 100. The outer extremity 100 extends between the outer ends 92B and 94B, is curved outwardly and defines contact surface 102, which is curved outwardly. The inner ends 92A and 94B are each formed integrally with the upper section 60. Shroud 50 has three couplings 90 equally spaced apart circumferentially, and it can have more in alternate embodiments.

Figure 5:
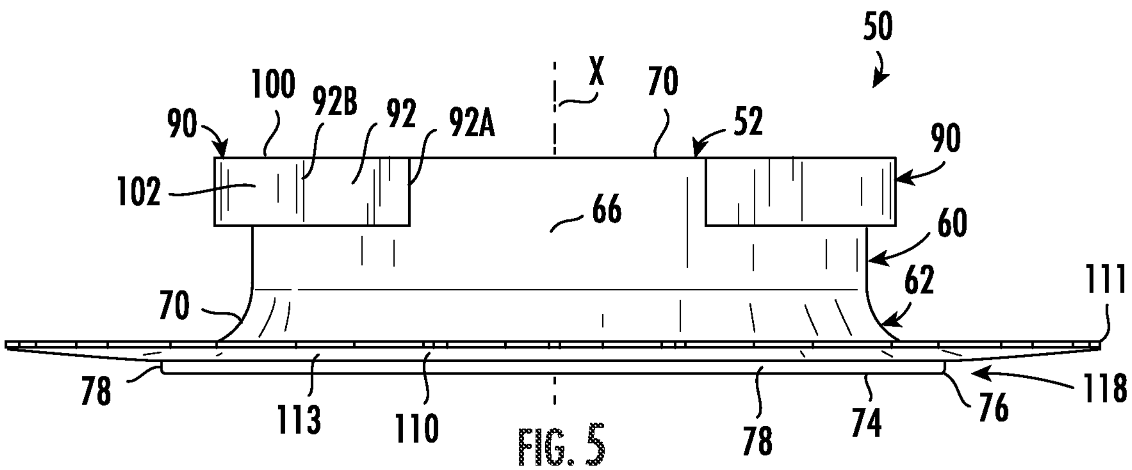
FIG. 5 is a side elevation view of the embodiment of FIG. 1.
Figure 6:
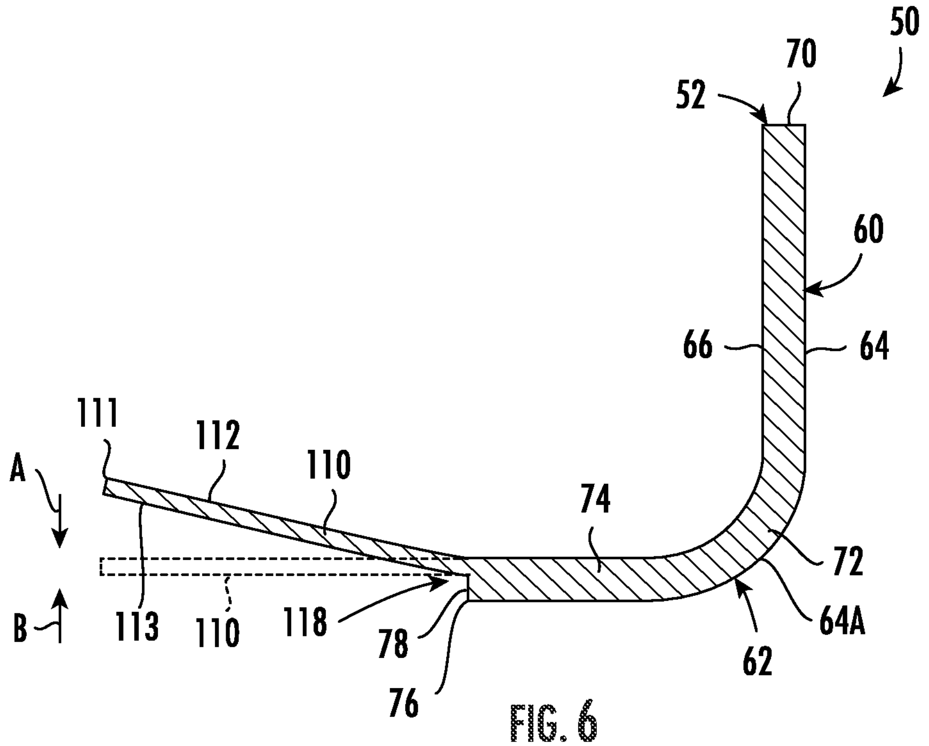
FIG. 6 is a section view taken along line 6-6 of FIG. 3.

The shroud 50 has a finishing flange 110. The finishing flange 110, a ceiling-engaging flange, is a continuous ring that extends outward radially from the perimeter extremity 76 to a perimeter edge 111. The finishing flange 110 has upper and lower surfaces 112 and 113 that extend from the perimeter extremity 76 to the perimeter edge 11. The upper surface 112 and the outer surface 66 are contiguous, in which the upper surface 112 extends from the outer surface 66 at a coplanar transition therebetween. The annular body 52 has a 5-6 mm axial thickness along its extent from its inner surface 54 to its outer surface 56, whereas the finishing flange 110 is comparatively thin along its extent, having a 2-3 mm axial thickness from its upper surface 112 to its lower surface 113. The perimeter edge 111 is notched, defining alternating notches 115 and tabs 116. The notches 115 are identical, and the tabs 116 are identical. The lower surface 113 extends inwardly from the perimeter edge 111, and flange's 74 axial surface 78 extends upwardly from the inner surface 64 of the flange 74 to the lower surface 113, defining an annular notch 118. In other words, the lower surface 116 intersects the axial surface 78 of the perimeter extremity 76, forming an annular notch 118. The finishing flange 110 is without openings throughout its extent. The finishing flange 110 has shape memory, is tensionable, and, when unflexed, has a normal orientation extending upward angularly from the flange 74 to the perimeter edge 111 above the flange 74. The finishing flange 110 extends upward angularly to its perimeter edge 111 above the flange 74 from the flange's 74 perimeter extremity 76. In FIG. 5, the finishing flange 110 is tensioned when it is flexed downward in the direction of arrow A out of its normal orientation to its comparatively flattened dotted line activated orientation relative to the annular body 52. When the finishing flange 110 is flexed downward in the direction of arrow A to its dotted line activated orientation in FIG. 6, it is constantly biased upward in the direction of arrow B to its normal, unflexed position. The finishing flange 110 is arranged and symmetrical about axis X.

Figure 7:
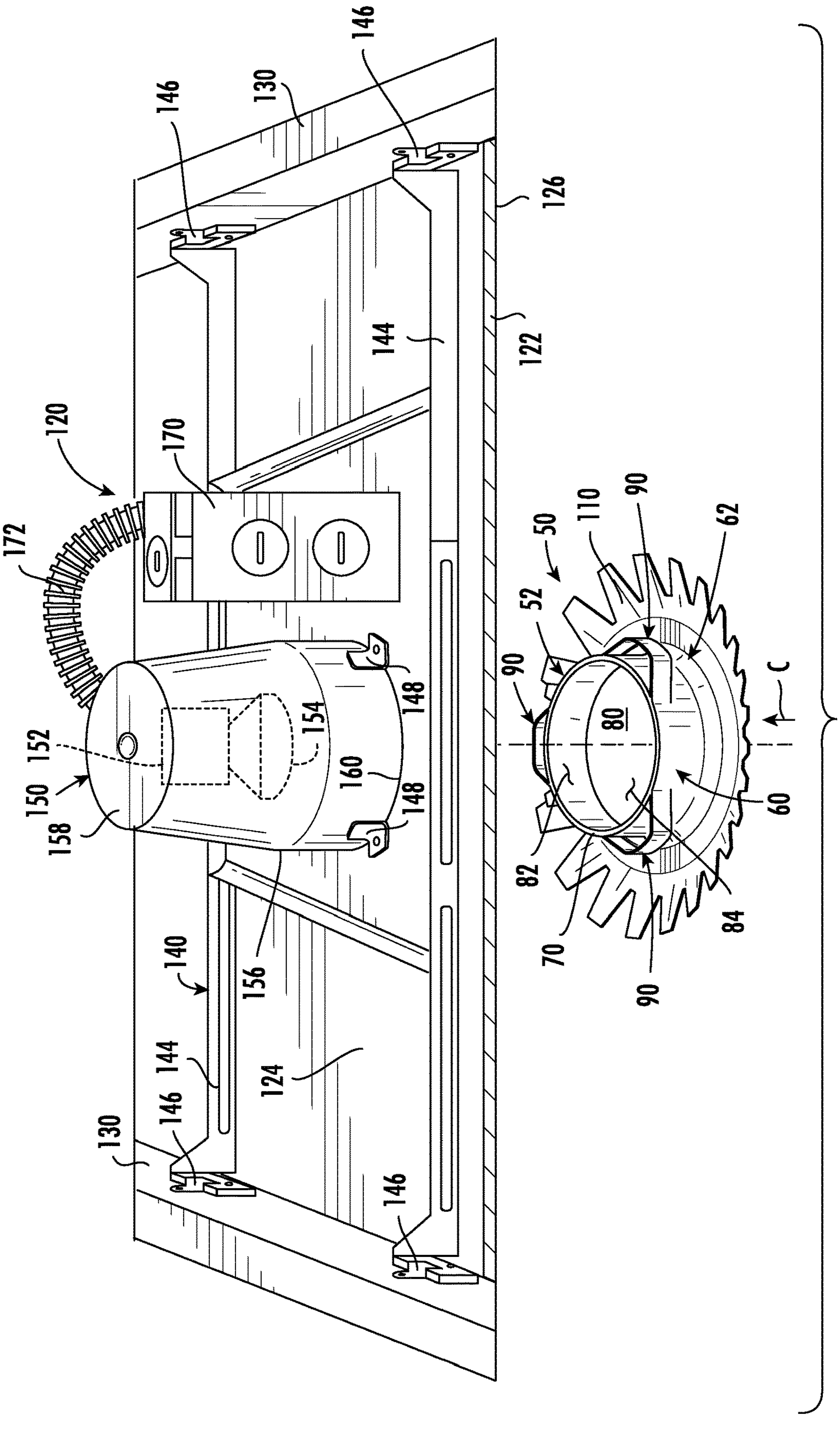
FIG. 7 is a top perspective view of a downlight, including a hanger assembly supporting a downlight housing over a ceiling, and the finishing shroud first illustrated in FIG. 1 spaced under the ceiling and the downlight housing.

Shroud 50 is configured and sized for use with a standard downlight 120 in FIG. 7. Referring relevant part to FIGS. 7 and 10-14, a ceiling 122, a board of, for example, plaster, drywall, or wood, of a building includes an upper side 124 and a lower side 126. An opening 128 extends through the ceiling 122 from the upper side 124 to the lower side 126. The building's ceiling framing 130 secured to the ceiling's 122 upper side 124 supports the ceiling 122 at its elevated location over the building's underlying space in a customary manner. The downlight 120, a standard cannister or can light, includes a hanger assembly 140 secured to the framing 130. The hanger assembly 140 supports a downlight housing 150 and a junction box 170. In this example, the hanger assembly 140 includes a tray 142 mounted to opposed, parallel, elongate supports 144 that extend outward to the customary bracketed ends 146 secured to the framing 130 by fasteners, such as nails or screws. Brackets 148 secure the downlight housing 150 to the tray 142. The downlight housing 150, a cylindrical can configured with a light support 152 that supports and electrically connects to a lamp 154, includes a continuous sidewall 156 that extends downward from a closed end 158 at the housing's 150 upper end to the tray 142, through and beyond an opening 160 through tray into the ceiling's opening 128 through the upper side 124 to a rim 162 adjacent to the ceiling's 122 lower side 126. The rim 162 at the housing's 150 lower end encircles an opening 164 open to the housing's 150 chamber 166 where the light support 152 and the lamp 154, a standard light bulb, reside. A continuous, cylindrical inner surface 168 of the housing 150 extends between the housing's 150 closed end 158 and the rim 162 and faces and defines the chamber 166. Standard electrical wiring housed in a wiring conduit 172 electrically connects the housing's 150 light support 152 to the junction box 170, secured to the tray 142 with suitable clips and configured to be electrically connected to the building's electrical wiring by standard wiring techniques. The housing 150 is visible at the ceiling's opening 128 when looking upward from below the ceiling's 122 lower side 126. Electrical power transmitted to the light support 152 from the junction box 170 when energized illuminates the lamp 154. Light generated by the lamp 154 shines through the housing's 150 opening 164 and the opening 128 in the ceiling 122, concentrating the light in a downward direction into the building's space below the lower side 126 of the ceiling as a broad floodlight or narrow spotlight. The shroud 50, when secured to the housing 150 and applied against the ceiling's 122 lower side 126 detailed below, finishes the downlight 120 installation and the surrounding lower side 126 of the ceiling 122 and provides a useful transition between the ceiling's 122 lower side 126 and the housing's 150 chamber 166 over which a skilled workman applies a ceiling finishing material.

Figure 8:
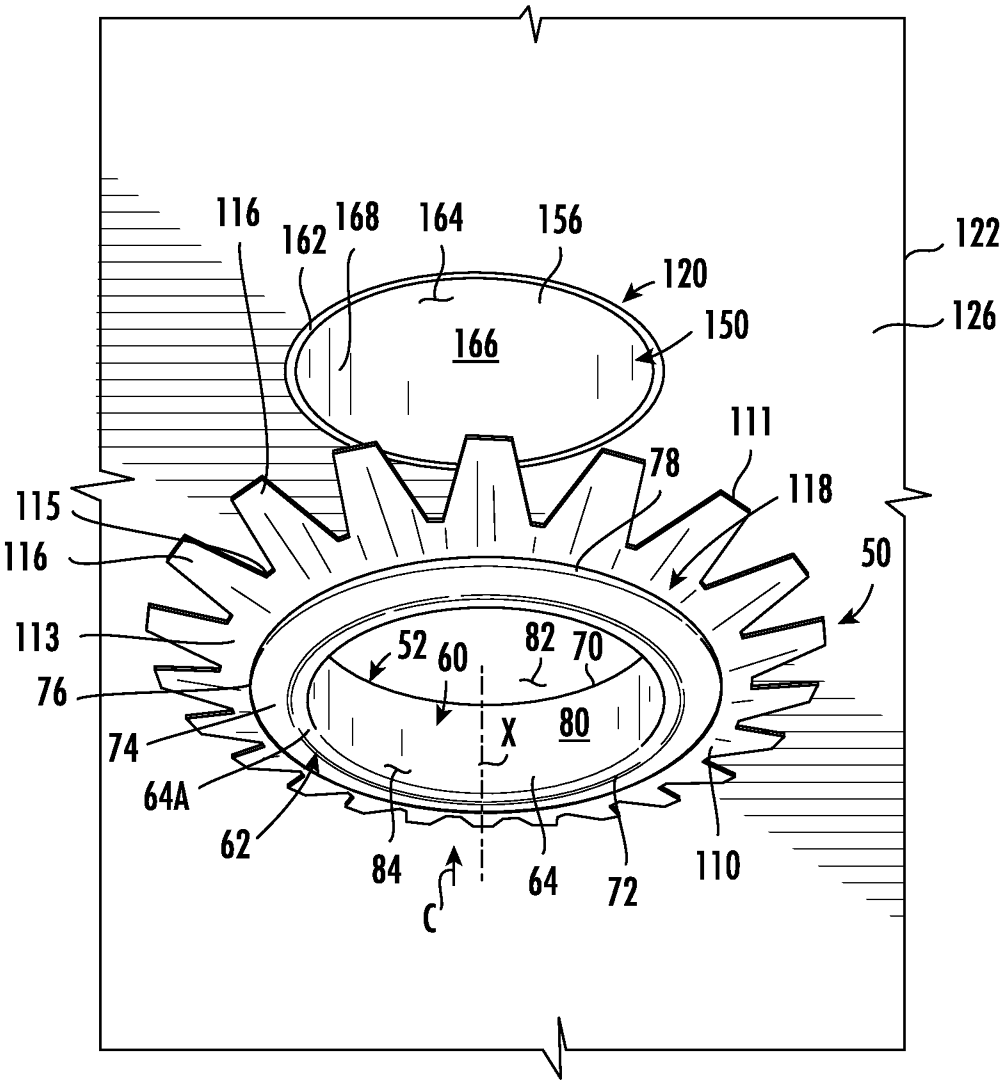
FIG. 8 is a bottom perspective view corresponding to FIG. 7, illustrating the finishing shroud spaced under the downlight housing extending into a ceiling opening through the ceiling.

In FIGS. 7 and 8, a user installs the shroud 50 by registering it upright under the ceiling's 122 lower side 126 and the housing's 150 opening 164 from its lower end at the lower section 62 to its rim 70 and inlet 82 at its upper end. He forcibly inserts the upper section 60 of the shroud 50 rim 70 first into the chamber 166 through the housing's 150 opening 164 by moving the shroud 50 upward in the direction of arrow C until the outer surface 66 of the flange 74 contacts the lower side 126 of the ceiling 122 in FIG. 11, setting the shroud 50 to its installed position assembled with the housing 150 and the ceiling in FIG. 12. When the outer surface 66 of the flange 74 contacts the lower side 126 of the ceiling 122 in FIG. 11, the shroud 50 is in and disabled from moving upwardly beyond its installed position assembled with the housing 150. The dimensions of the shroud 50 enable its upper section 60 and its couplings 90 to pass into the chamber 166 through the housing's 150 opening 164 and the coupling's 90 contact surfaces 102 to concurrently encounter, frictionally engage and slide upwardly across the housing's 150 continuous inner surface 168 until the shroud 50 reaches its installed position, when the upper surface 66 of the flange 74 contacts the ceiling's 122 lower side 126. The couplings 90 between the outer surface 66 of the upper section 60 of the annular body 52 and the housing's 150 inner surface 168 concurrently tension the respective contact surfaces 102 against the inner surface 168, securing the shroud 50 to the inner surface 168 of the housing 150 frictionally.

Figure 9:
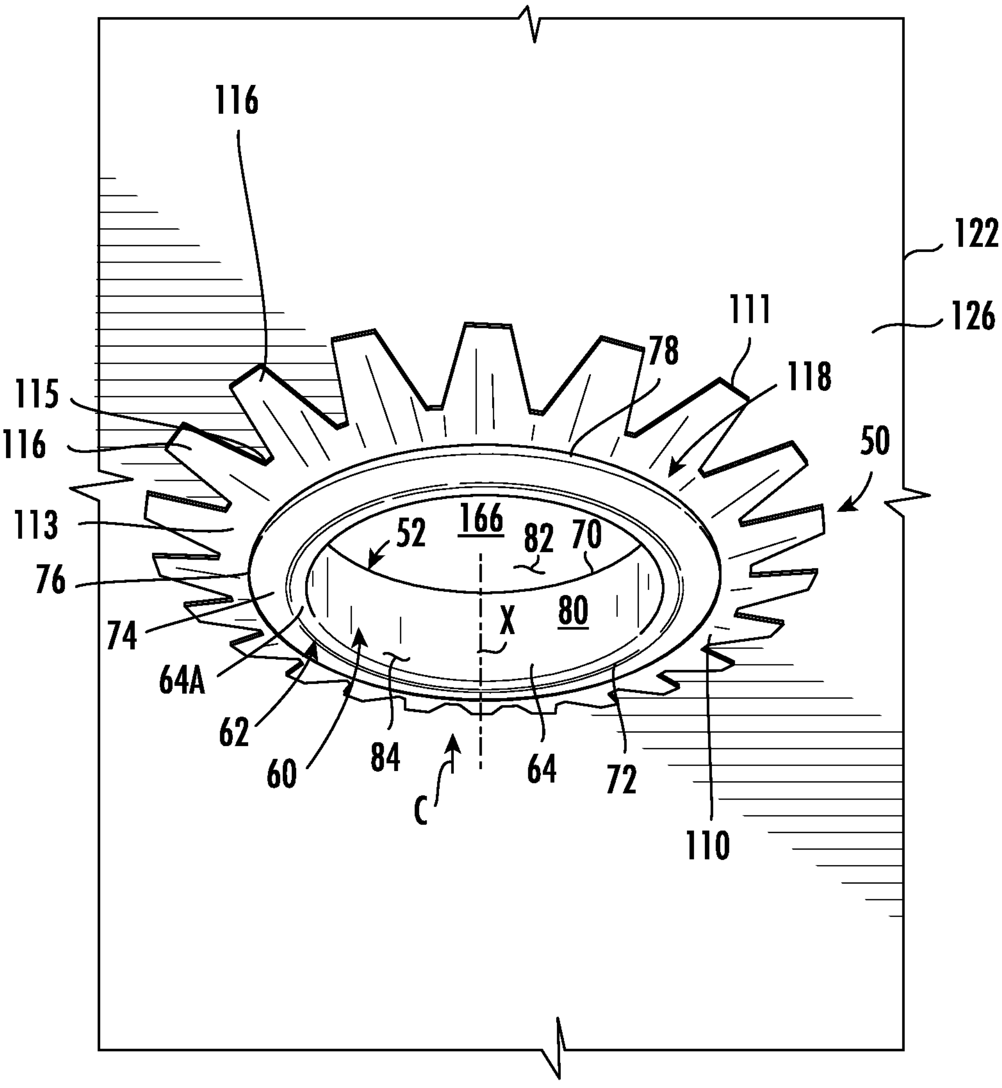
FIG. 9 is a view corresponding to FIG. 8, illustrating the finishing shroud partially assembled with the downlight housing.
Figure 10:
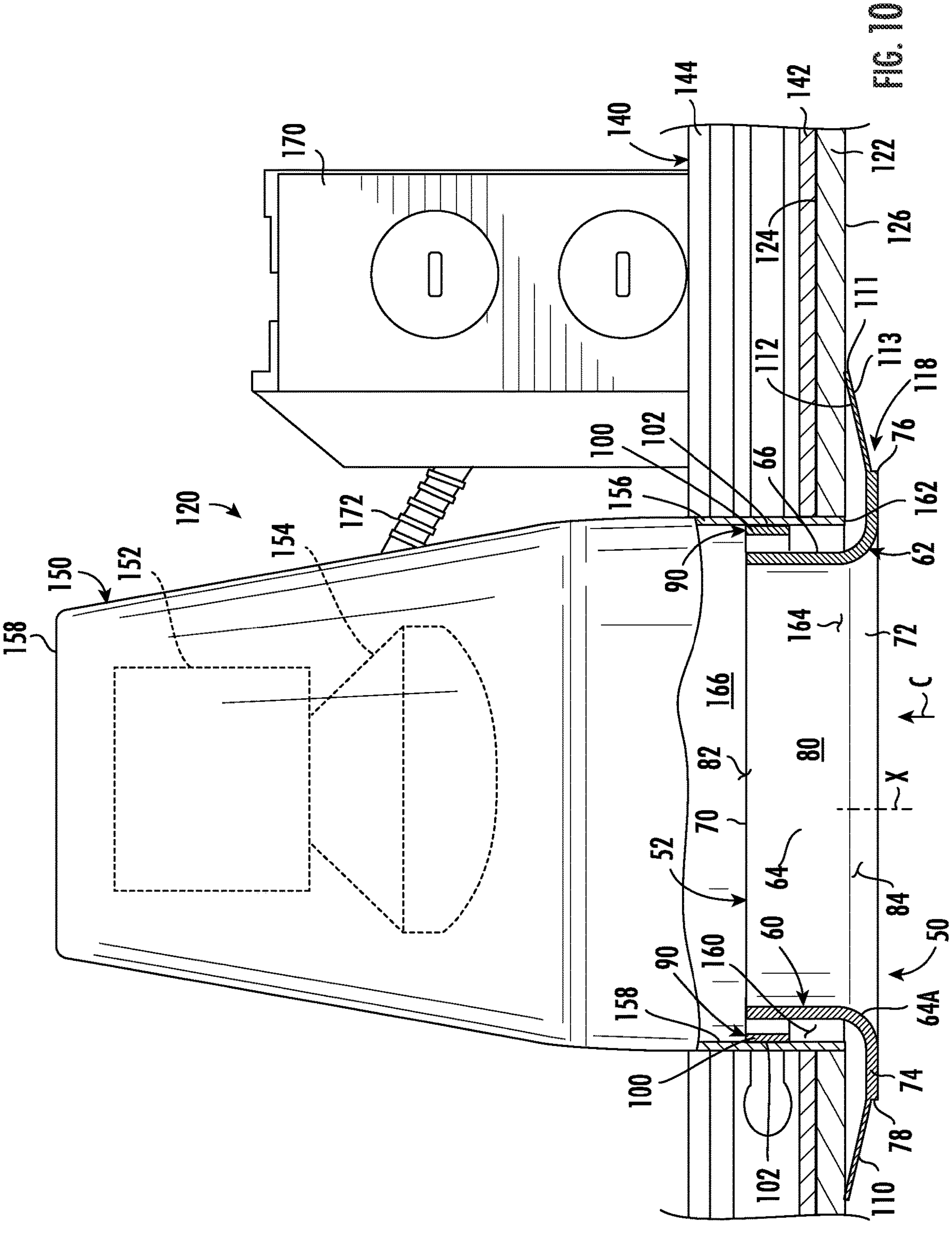
FIG. 10 is a fragmented side elevation view corresponding to FIG. 7, illustrating the finishing shroud partially assembled with the downlight housing corresponding to FIG. 9, the ceiling, part of the hanger assembly, and the finishing shroud sectioned vertically for illustrative purposes.
Figure 11:
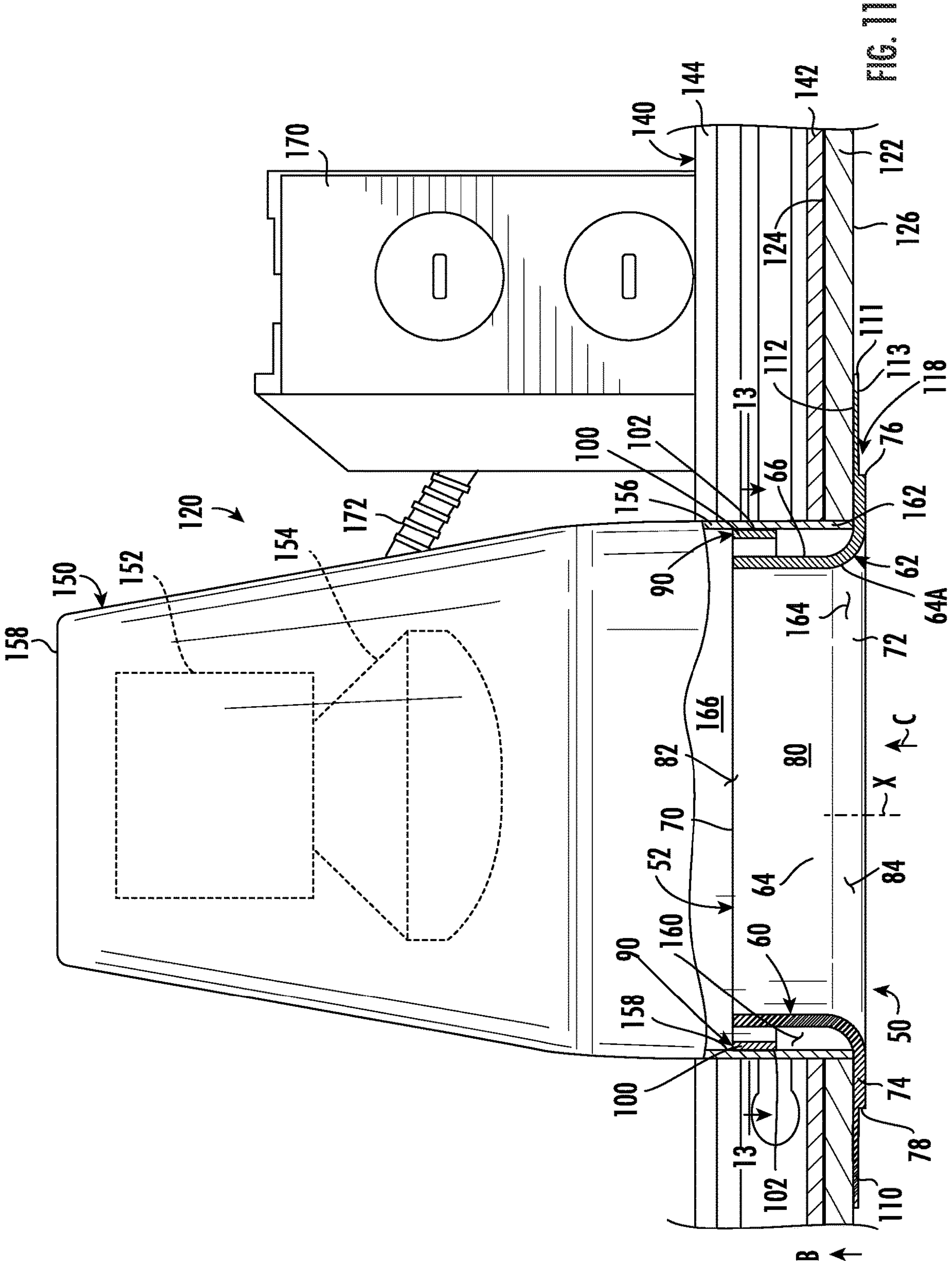
FIG. 11 is a view similar to FIG. 10, illustrating the finishing shroud assembled with the downlight housing.

Before the shroud 50 reaches its installed position assembled with the housing 150 in FIG. 11, the upper surface 112 of the finishing flange 110, now in its normal, unflexed orientation extending upward from the flange 74 to the perimeter edge 111 above the flange 74 and its outer surface 66, adjacent to its perimeter edge 111 strikes the ceiling's 122 lower side 126 in FIGS. 9, and 10, when the shroud 50 is partially assembled with the housing 150. The continued upward movement of the shroud 50 in the direction of arrow C on its way to its installed position from its partially installed position deflects the finishing flange 110 against the ceiling's 112 lower side 126, flexing the finishing flange 110 from its normal orientation in FIGS. 9 and 10 to its activated orientation position in FIGS. 11 and 12 relative to the annular body 52 when the shroud 50 reaches its installed position assembled with the housing 150, when the flange's 74 outer surface 66 contacts the lower side 126 of the ceiling 122. While the finishing flange 110 is configured to flex as described, the annular body 52, including its flange 74, does not flex when the finishing flange 100 flexes when the shroud 50 is installed as described because the annular body 52 is sufficiently stiff compared to the finishing flange 110.

Figure 12:
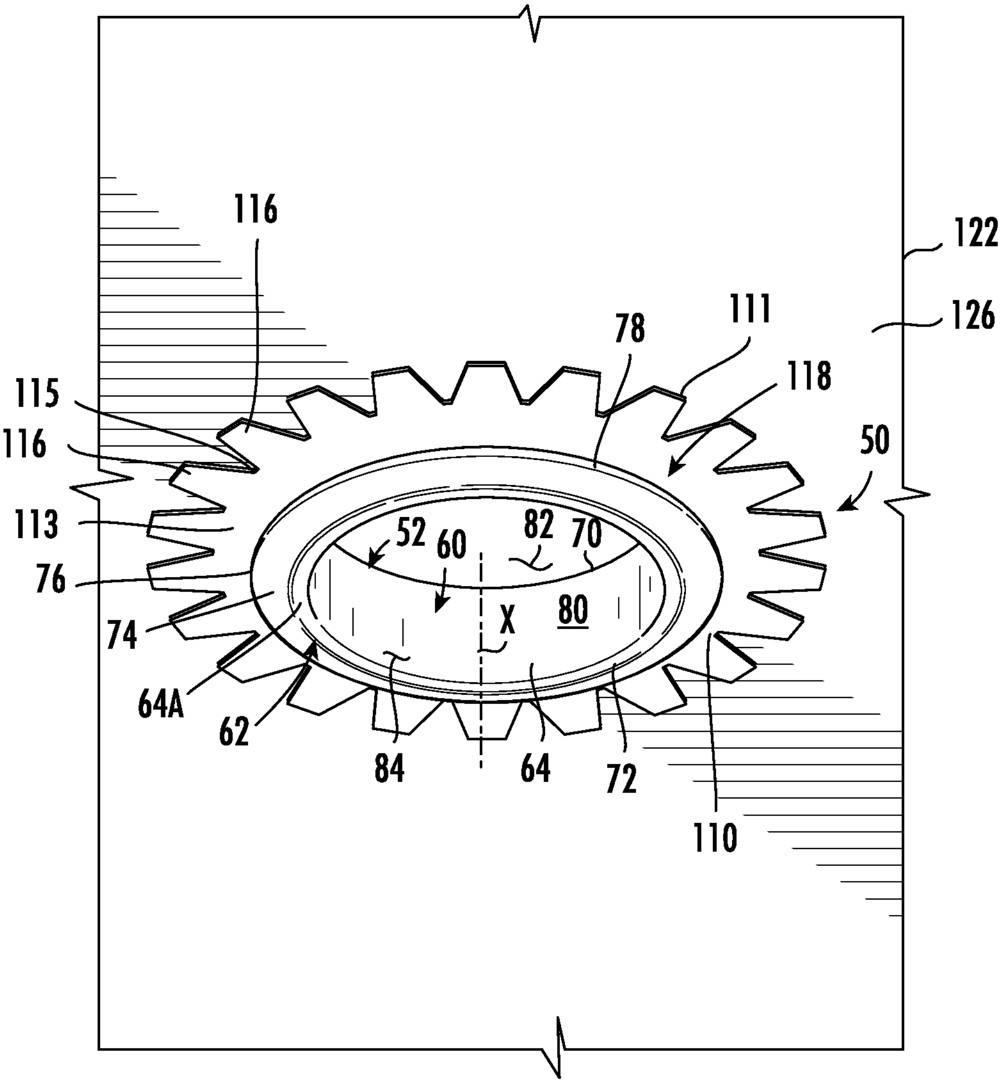
FIG. 12 is a view similar to FIG. 8 illustrating the finishing shroud fully assembled with the downlight housing according to FIG. 11.
Figure 13:
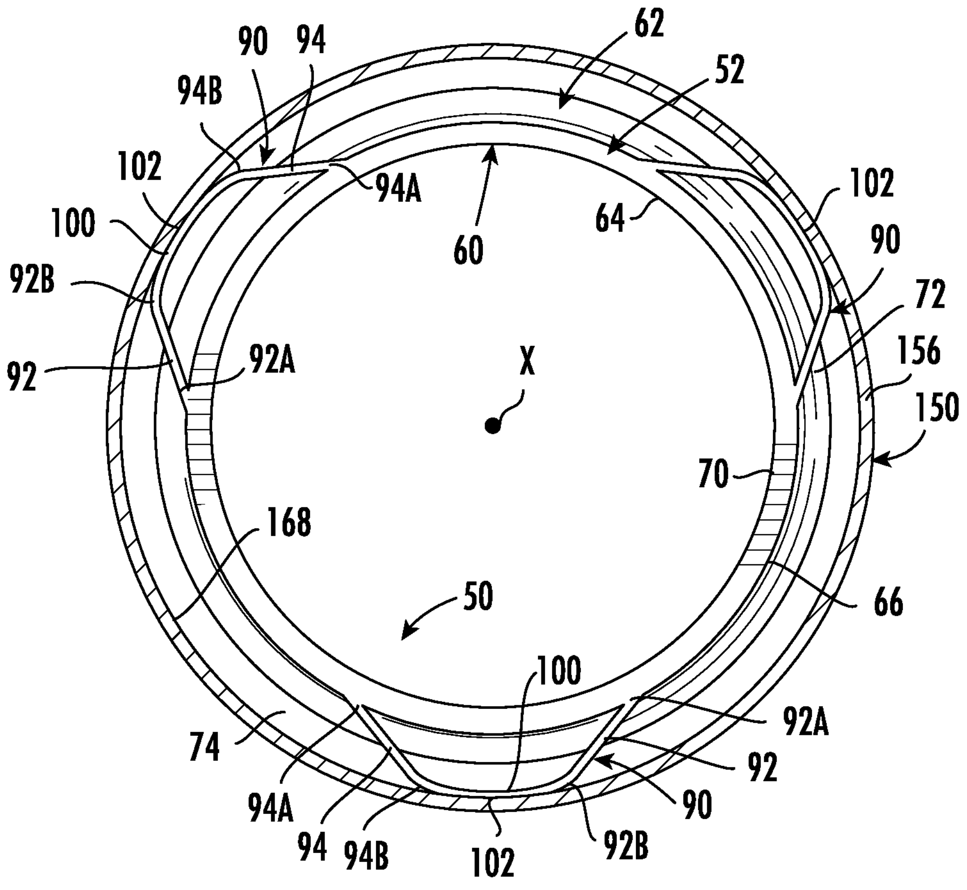
FIG. 13 is section view taken along line 13-13 of FIG. 11.

FIG. 11 shows the shroud 50 assembled with the housing 150 and the ceiling 122, also shown in FIG. 12. Referring in relevant part to FIG. 11, FIG. 12, and FIG. 13, a section view taken along line 13-13 of FIG. 11, the couplings 90 in the chamber 166 extend outward radially from the outer surface 66 of the upper section 60 in the chamber 166 to their contact surfaces 102 frictionally engaged directly against the inner surface 168 of the housing 150. The dimension between the upper section's 60 outer surface 66 and the housing's 150 inner surface 168 compresses the couplings 90 therebetween, concurrently tensioning the couplings 90 pressing the coupling's 90 contact surfaces 102 directly against the inner surface 168 of the housing 150, securing the shroud 150 in its installed positioned assembled with the housing 150. The upper section 60 extends downward through the chamber 166 from the rim 70 under the light support 152 and its lamp 154 to the lower section 62. The lower section 62 curves downward through the chamber 166 along the curved part 72 from the upper section 60 and outward radially through the housing's 150 opening 164 and the ceiling's 122 opening 128 and under the housing's 150 rim 162 to the horizontal flange 74 outside the housing's 150 chamber 166 and the ceiling's 122 opening 128. The flange 74 extends outward radially under the lower side 126 of the ceiling 122 to its perimeter extremity 76 beyond the housing's 150 rim 162 and the ceiling's 122 opening 128, the flange's 74 outer surface 66 pressed flat against the ceiling's 122 lower side 126. The finishing flange 110 extends outward radially under the lower side 126 from the perimeter extremity 76 to the perimeter edge 111. The finishing flange's 110 upper surface 112 is pressed flat against the ceiling's 122 lower side 126, and the finishing flange 110 is flexed into its flattened activated orientation. The contiguous upper surface 112 of the finishing flange 50 and the outer surface 66 of the flange 74 lay flat against the ceiling's 122 lower side 126, which prevents axial movement between lower side 126 and the coplanar surfaces 112 and 66 flat against the lower side 126. The activated orientation of the finishing flange 50 tensions it, constantly urging the upper surface 112 upward in the direction of arrow B against the ceiling's 122 lower side 126, disabling the perimeter edge 11 from turning downward from the ceiling's 122 lower side 126. The frictional engagement of the coupling's 90 contact surfaces 102 against the inner surface 168 of the housing 150 is sufficiently strong to disable the bias exerted by the finishing flange 150 against the lower side 126 of the ceiling 122 from displacing the shroud 50 out of its installed position. The inner surface 64 of the curved part 72 defines the shroud's 50 transition surface 64A between the upper section 60 and the lower section's 62 flange 74 and rounds outwardly between the upper section 60 and the flange 74. The light flow pathway 80 extends through the finishing flange 50 to the outlet 84 from the overlying inlet 82 open upward to the chamber 166 under the lamp 154 supported by the overlying light support 152. Light generated by the lamp 154 shines through the light flow pathway 80 from the inlet 82 to the outlet 84 and outwardly through the outlet 84, concentrating the light in a downward direction into the building's space below the lower side 126 of the ceiling as a broad floodlight or narrow spotlight. The light flow pathway 80 channels the light into the building's space from the lamp 154 within the housing 150. The installation of the shroud 50 requires no separate fasteners and no modification to either the housing 150 or the ceiling 122. The size of the housing 150 can vary, and the shroud 50 is sized correspondingly to enable it to be assembled with the housing 150 as described herein.

Figure 14:
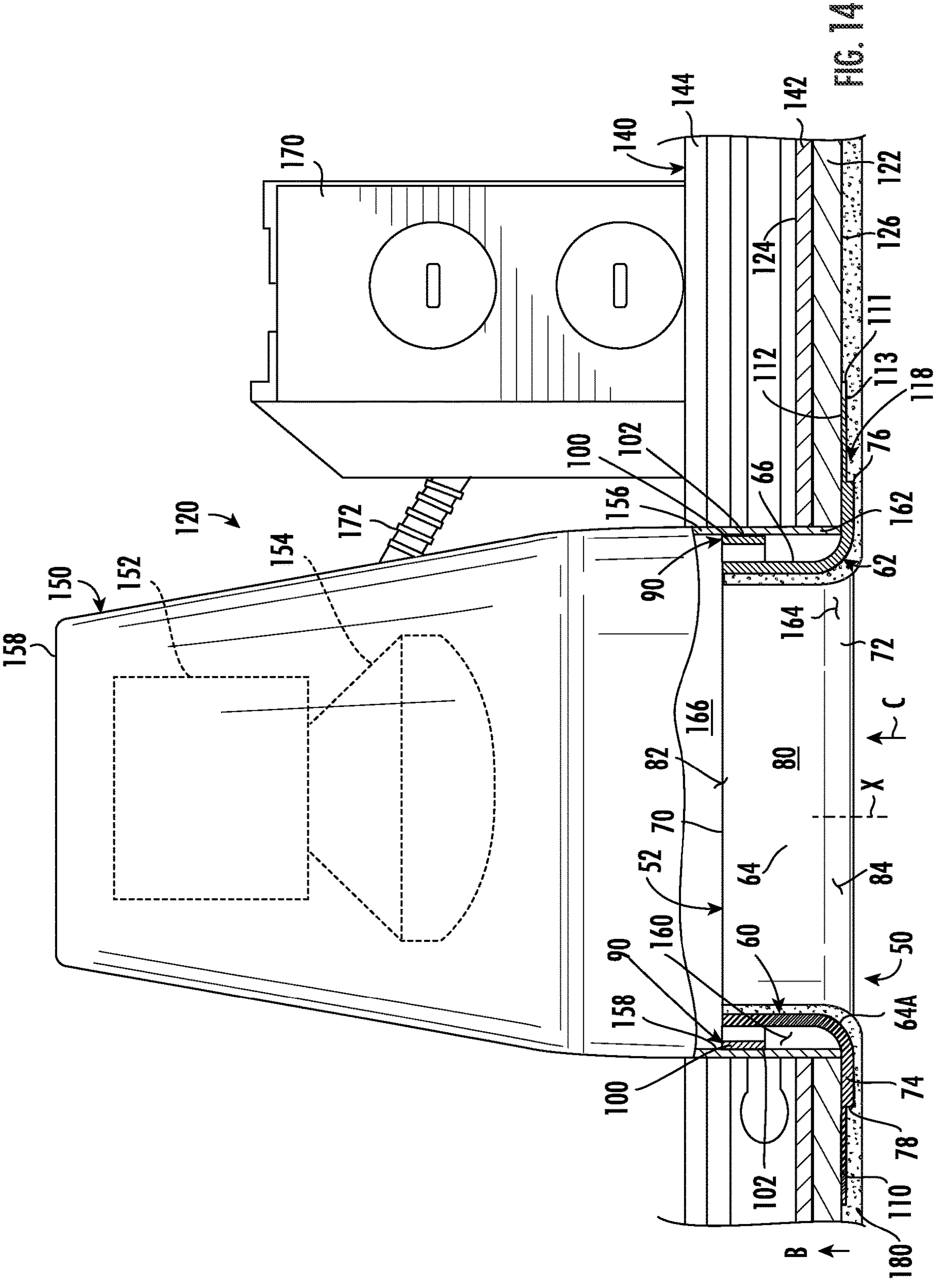
FIG. 14 is a view corresponding to FIG. 11, the finishing shroud finished with a finishing material.
Figure 15:
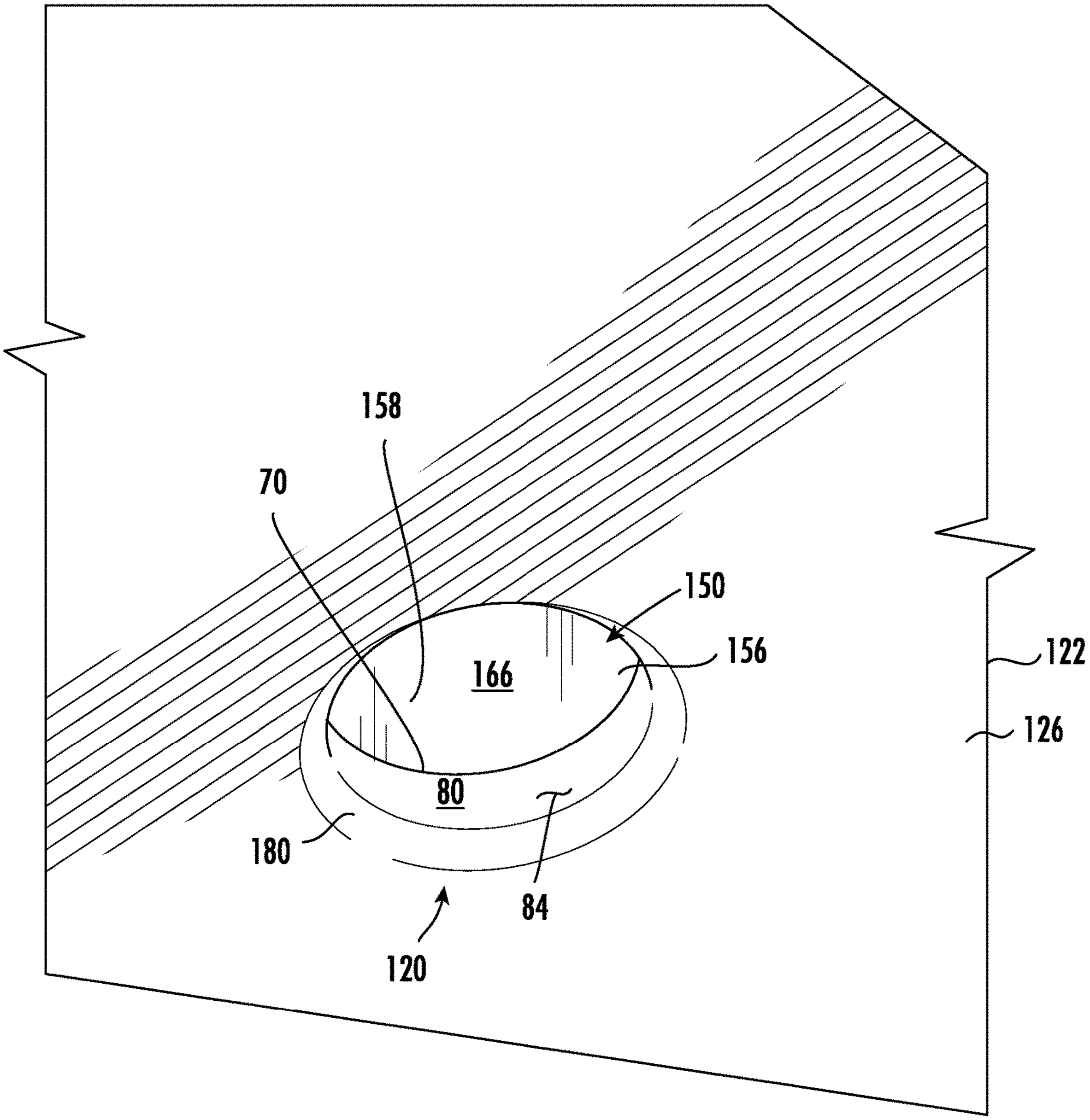
FIG. 15 is a view like FIG. 9 illustrating the downlight as it would appear finished according to FIG. 14.
Figure 16:
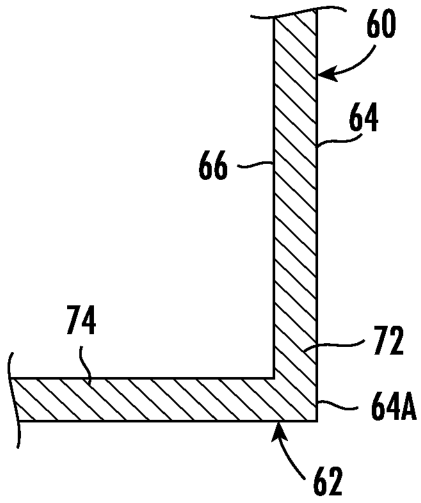
FIGS. 16 and 17 are fragmented, vertical section views of alternate embodiments of shroud transition profiles.
Figure 17:
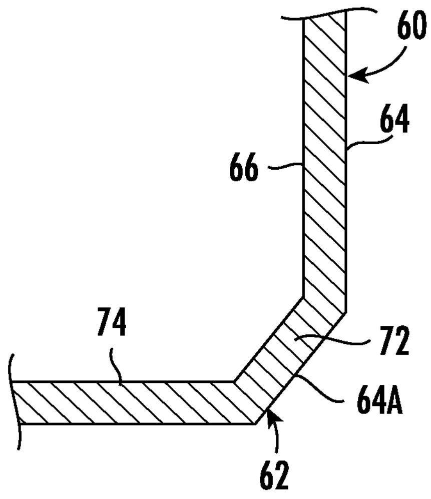

The shroud 50 secured to the housing 150 and applied over and concealing its rim 162 in FIG. 11 and against the ceiling's 122 surrounding lower side 126 extending outward radially from the ceiling's 122 opening 128 to the perimeter edge 111 of the finishing flange 50 as detailed above and shown in FIGS. 11 and 12 finishes the downlight 120 installation and the surrounding lower side 126 of the ceiling 122. Accordingly, the finishing flange 50 provides a useful transition between the ceiling's 122 lower side 126 and the housing's 150 chamber 166 over which a skilled workman applies a ceiling finishing material 180 in FIG. 14. The addition of the finishing material 180, a standard plaster or joint compound, over the ceiling's 122 lower side 126 leading up to and over the finishing flange 50 from the finishing flange's 50 perimeter edge 111 and upwardly into the chamber 166 across the curved part 72 to the rim 70 of the upper section 60 in the chamber 166 completes the installation in FIGS. 16 and 17. A skilled workman applies the finishing material 180 over the ceiling's 122 lower side 126 around the shroud 50, over the lower surface 113 of the finishing flange 50 from the perimeter edge 111 to the inner surface 64, and over the inner surface 64 upwardly into the chamber 166 over the curved part's 72 transition surface 64A to the upper section's 60 rim 70. The workman applies and smooths the finishing material 180 with a wide blade tool, contouring it to the inner surface 64 of the annular body 52 and across its transition surface 64A from the perimeter extremity 76 to the rim 70. Once the finishing material 180 dries, the workman sands it and repeats the process if needed before painting. The alternating notches 115 and tabs 116 of finishing flange's 50 perimeter edge 111 and the annular notch 118 provide engagement points that accept the finishing material 180 to provide a secure attachment. In FIGS. 14 and 15, the finishing material 180 extending over the shroud 50, covered with the finishing material 180 and not visible in FIG. 15, extends upwardly into the chamber 166, rounding upwardly into the chamber 166 across the finishing flange's 50 rounded transition surface 64A in FIG. 14, having the appearance of rounded transition disappearing into the chamber 166 when looking upwardly at the finished installation from below in FIG. 15. The activated orientation of the finishing flange 50 constantly tensioning its upper surface 112 against the lower side 126 of the ceiling 122 disabling the perimeter edge 11 from turning down from the ceiling's 122 lower side 126, prevents the finishing material 180 from cracking at the transition between the lower side 126 of the ceiling and the perimeter edge 111 of the finishing flange 50.

The shroud's 50 lower section 62 extends downward from the upper section 60 and curves outward radially in along its curved part 72 to the lower section's 62 horizontal flange 74 at the lower end of the annular body 52, the inner surface 64 of the upper section 60 and the inner surface 64 of the flange 74 of the lower section 62 do not meet at a corner, and the inner surface 64 of the upper section 60 and the inner surface 64 of the flange 74 of the lower section 62 meet the transition surface 64A that extends between the upper section's 60 inner surface 64 and the flange's 74 inner surface 64. In shroud 50, the transition part 72 between the upper section 60 and the flange 74 is curved/rounded, having a curved/rounded transition profile defining the transition surface 64A between the upper section 60 and the flange 72 that is curved or otherwise rounded as shown and described. In alternate embodiments, the transition part 72 of a shroud constructed and arranged in accordance with the invention can have any transition profile defining a desired or otherwise corresponding transition surface 64A, such as corner profile defining a corresponding corner transition surface 64A in FIG. 16 defining a "square edge or perimeter" outlet, a chamfered or angular profile defining a corresponding chamfered or angular transition surface 64A in FIG. 17 defining a "chamfered or angular perimeter" outlet, or other chosen profile defining its corresponding transition surface.

The present invention is described above with reference to illustrative embodiments. Those skilled in the art will recognize that changes and modifications may be made in the described embodiments without departing from the present invention. Various changes and modifications to the embodiments herein chosen for purposes of illustration will occur to those skilled in the art. To the extent that such modifications and variations do not depart from the invention, they are intended to be included within the scope thereof.

Having fully described the invention in such clear and concise terms as to enable those skilled in the art to understand and practice the same, the invention claimed is:

1. A finishing shroud for a downlight, the finishing shroud comprising:

an annular body comprising an upper section, configured with couplings, extending downward from a rim to a lower section extending downward from the upper section to a horizontal flange extending outward radially to a perimeter extremity, the couplings are tensionable, spaced apart circumferentially and each extending outward from the upper section to a contact surface, and a light-flow pathway through the annular body from an inlet defined by the rim to an outlet defined by the lower section; and a finishing flange extending outward radially from the perimeter extremity to a perimeter edge, the finishing flange is tensionable, has a normal orientation extending upward from the horizontal flange to the perimeter edge, and is tensioned when flexed downward out of the normal orientation to an activated orientation.

2. The finishing shroud according to claim 1, the perimeter edge notched, comprising alternating notches and tabs.

3. The finishing shroud according to claim 2, wherein the notches are identical and the tabs are identical.

4. The finishing shroud according to claim 1, further comprising the annular body and the finishing flange without openings.

5. The finishing shroud according to claim 1, the couplings each comprising:

a first arm including a first end connected to the upper section;

a second arm including a second end connected to the upper section;

the first end and the second end spaced apart circumferentially; and the first arm and the second arm converging outward at an outwardly curved extremity from the first end and the second end, respectively, the outwardly curved extremity defining the contact surface curved outwardly.

6. The finishing shroud according to claim 5, further comprising the first end and the second end each formed integrally with the upper section.

7. A downlight, comprising:

a finishing shroud, comprising:

an annular body comprising an upper section, configured with couplings, extending downward from a rim to a lower section extending downward from the upper section to a horizontal flange extending outward radially to a perimeter extremity, the couplings are tensionable, spaced apart circumferentially and each extending outward from the upper section to a contact surface, and a light-flow pathway through the annular body from an inlet defined by the rim to an outlet defined by the lower section; and a finishing flange extending outward radially from the perimeter extremity to a perimeter edge, the finishing flange is tensionable, has a normal orientation extending upward from the horizontal flange to the perimeter edge, and is tensioned when flexed out of the normal orientation to an activated orientation;

a ceiling including an upper side, a lower side, and a ceiling opening through the ceiling from the upper side to the lower side;

a downlight housing including an inner surface encircling a chamber and a housing rim encircling a housing opening to the chamber, the downlight housing extending downward into the ceiling opening through the upper side to the housing rim adjacent to the lower side; and the couplings concurrently tensioning the respective contact surfaces against the inner surface, securing the shroud to the inner surface of the downlight housing frictionally, the upper section extending downward through the chamber from the rim to the lower section extending downward from the upper section and outward through the housing opening and the ceiling opening and under the housing rim to the horizontal flange extending outward radially under the lower side to the perimeter extremity beyond the housing rim and the ceiling opening, the finishing flange extending outward radially under the lower side from the perimeter extremity to the perimeter edge, the finishing flange pressed against the lower side flexing the finishing flange out of the normal orientation to the activated orientation tensioning the finishing flange constantly urging it upward against the lower side, disabling the perimeter edge from turning downward from the lower side, and the inlet open upward to the chamber.

8. The downlight according to claim 7, further comprising a finishing material applied over the finishing flange from the perimeter edge to the perimeter extremity and over the annular body from the perimeter extremity to the rim.

9. The downlight according to claim 8, the finishing material comprising a plaster or a joint compound.

10. The downlight according to claim 7, the perimeter edge notched, comprising alternating notches and tabs.

11. The downlight according to claim 10, wherein the notches are identical and the tabs are identical.

12. The downlight according to claim 7, further comprising the annular body and the finishing flange without openings.

13. The downlight according to claim 7, the couplings each comprising:

a first arm including a first end connected to the outer surface;

a second arm including a second end connected to the outer surface;

the first end and the second end spaced apart circumferentially; and the first arm and the second arm converging outward at an outwardly curved extremity from the first end and the second end, respectively, the outwardly curved extremity defining the contact surface curved outwardly.

14. The downlight according to claim 13, further comprising the first end and the second end each formed integrally with the upper section.

15. A finishing shroud for a downlight, comprising:

an annular body comprising an upper section, a lower section, an inner surface, and an outer surface, the upper section cylindrical, configured with couplings, and extending downward from a rim to the lower section extending downward from the upper section and extending outward radially to a horizontal flange extending outward radially to a perimeter extremity, the inner surface and the outer surface extending from the rim to the perimeter extremity, the couplings are tensionable, spaced apart circumferentially and each extending outward from the outer surface to a contact surface, and a light-flow pathway through the annular body from an inlet defined by the rim to an outlet defined by the lower section, the inner surface of the lower section comprising a transition surface between the upper section and the horizontal flange; and a finishing flange extending outward radially from the perimeter extremity to a perimeter edge, the finishing flange includes an upper surface and a lower surface extending from the perimeter extremity to the perimeter edge, is tensionable, has a normal orientation extending upward from the horizontal flange to the perimeter edge, and is tensioned when flexed downward out of the normal orientation to an activated orientation.

16. The finishing shroud according to claim 15, the perimeter edge notched, comprising alternating notches and tabs.

17. The finishing shroud according to claim 16, wherein the notches are identical and the tabs are identical.

18. The finishing shroud according to claim 15, further comprising the annular body and the finishing flange without openings.

19. The finishing shroud according to claim 15 further comprising the upper surface extending from the outer surface at a coplanar transition therebetween.

20. The finishing shroud according to claim 15, further comprising the lower surface intersecting an axial surface of the perimeter extremity forming an annular notch.

21. The finishing shroud according to claim 15, the couplings each comprising:

a first arm including a first end connected to the outer surface;

a second arm including a second end connected to the outer surface;

the first end and the second end spaced apart circumferentially; and the first arm and the second arm converging outward at an outwardly curved extremity from the first end and the second end, respectively, the outwardly curved extremity defining the contact surface curved outwardly.

22. The finishing shroud according to claim 21, further comprising the first end and the second end each formed integrally with the upper section.

23. A downlight, comprising:

a finishing shroud, comprising:

an annular body comprising an upper section, a lower section, an inner surface, and an outer surface, the upper section cylindrical, configured with couplings, and extending downward from a rim to the lower section extending downward from the upper section and extending outward radially to a horizontal flange extending outward radially to a perimeter extremity, the inner surface and the outer surface extending from the rim to the perimeter extremity, the couplings are tensionable, spaced apart circumferentially and each extending outward from the outer surface to a contact surface, and a light-flow pathway through the annular body from an inlet defined by the rim to an outlet defined by the lower section, the inner surface of the lower section comprising a transition surface between the upper section and the horizontal flange; and a finishing flange extending outward radially from the perimeter extremity to a perimeter edge, the finishing flange includes an upper surface and a lower surface extending from the perimeter extremity to the perimeter edge, is tensionable, has a normal orientation extending upward from the horizontal flange to the perimeter edge, and is tensioned when flexed out of the normal orientation to an activated orientation;

a ceiling including an upper side, a lower side, and a ceiling opening through the ceiling from the upper side to the lower side;

a downlight housing including an inner surface encircling a chamber and a housing rim encircling a housing opening to the chamber, the downlight housing extending downward into the ceiling opening through the upper side to the housing rim adjacent to the lower side; and the couplings concurrently tensioning the respective contact surfaces against the inner surface, securing the shroud to the inner surface of the downlight housing frictionally, the upper section extending downward through the chamber from the rim to the lower section extending downward from the upper section and outward through the housing opening and the ceiling opening and under the housing rim to the horizontal flange to the horizontal flange extending outward radially under the lower side to the perimeter extremity beyond the housing rim and the ceiling opening, the finishing flange extending outward radially under the lower side from the perimeter extremity to the perimeter edge, the upper surface pressed against the lower side flexing the finishing flange out of the normal orientation to the activated orientation tensioning the finishing flange constantly urging the upper surface upward against the lower side, disabling the perimeter edge from turning downward from the lower side, and the inlet open upward to the chamber.

24. The downlight according to claim 23, further comprising a finishing material applied over the lower surface of the finishing flange from the perimeter edge to the perimeter extremity and over the inner surface of the annular body from the perimeter extremity to the rim, the finishing material contoured to the inner surface of the annular body across the transition surface thereof from the perimeter extremity to the rim.

25. The downlight according to claim 24, the finishing material comprising a plaster or a joint compound.

26. The downlight according to claim 23, the perimeter edge notched, comprising alternating notches and tabs.

27. The downlight according to claim 26, wherein the notches are identical and the tabs are identical.

28. The downlight according to claim 23, further comprising the annular body and the finishing flange without openings.

29. The downlight according to claim 23, further comprising the upper surface extending from the outer surface at a coplanar transition therebetween.

30. The downlight according to claim 23, further comprising the lower surface intersecting an axial surface of the perimeter extremity forming an annular notch.

31. The downlight according to claim 23, the couplings each comprising:

a first arm including a first end connected to the outer surface;

a second arm including a second end connected to the outer surface;

the first end and the second end spaced apart circumferentially; and the first arm and the second arm converging outward at an outwardly curved extremity from the first end and the second end, respectively, the outwardly curved extremity defining the contact surface curved outwardly.

32. The downlight according to claim 31, further comprising the first end and the second end each formed integrally with the upper section.

* * * * *